US008747209B2

(12) United States Patent
Badrieh

(10) Patent No.: US 8,747,209 B2
(45) Date of Patent: Jun. 10, 2014

(54) MULTI-DRAW GAME SYSTEM

(75) Inventor: Waell Badrieh, Toronto (CA)

(73) Assignee: Bonobo PLC, Douglas, Isle of Man (GB)

( * ) Notice: Subject to any disclaimer, the term of this patent is extended or adjusted under 35 U.S.C. 154(b) by 1197 days.

(21) Appl. No.: 12/618,687

(22) Filed: Nov. 13, 2009

(65) Prior Publication Data

US 2011/0117985 A1 May 19, 2011

(51) Int. Cl.
*A63F 9/24* (2006.01)
*A63F 13/00* (2006.01)

(52) U.S. Cl.
USPC ............... 463/17; 463/16; 463/18; 463/19; 463/20

(58) Field of Classification Search
USPC .................................. 463/16, 17, 18, 19, 20
See application file for complete search history.

(56) References Cited

U.S. PATENT DOCUMENTS

| | | | |
|---|---|---|---|
| 5,297,802 A * | 3/1994 | Pocock et al. | 463/19 |
| 5,398,932 A | 3/1995 | Eberhardt | |
| 5,482,289 A * | 1/1996 | Weingardt | 273/269 |
| 5,518,253 A * | 5/1996 | Pocock et al. | 463/19 |
| 5,800,268 A | 9/1998 | Molnick | |
| 5,833,537 A * | 11/1998 | Barrie | 463/21 |
| 6,210,276 B1 | 4/2001 | Mullins | |
| 6,315,291 B1 * | 11/2001 | Moody | 273/139 |
| 6,793,219 B2 * | 9/2004 | Higginson | 273/269 |
| 6,830,514 B2 | 12/2004 | Meyer et al. | |
| 6,874,783 B2 | 4/2005 | Higginson | |
| 6,955,353 B2 | 10/2005 | Taylor et al. | |
| 7,145,898 B1 | 12/2006 | Elliott | |
| 7,163,459 B2 | 1/2007 | Tanskanen | |
| 7,481,707 B1 * | 1/2009 | Luciano et al. | 463/19 |
| 7,641,552 B2 * | 1/2010 | Manz | 463/37 |

(Continued)

FOREIGN PATENT DOCUMENTS

| | | |
|---|---|---|
| GB | 2385802 | 9/2003 |
| WO | WO 97/49470 | 12/1997 |
| WO | WO02054355 | 7/2002 |
| WO | WO2006086565 | 8/2006 |

OTHER PUBLICATIONS

International Search Report and Written Opinion in PCT Application No. PCT/CA2010/001758, issued Feb. 2, 2011, in 9 pages.

(Continued)

*Primary Examiner* — William Brewster
*Assistant Examiner* — Ryan Hsu
(74) *Attorney, Agent, or Firm* — Morgan, Lewis & Bockius LLP

(57) ABSTRACT

A method and game server for selecting a plurality of winners of a game is provided. The method comprises receiving a plurality of sets of player numbers from a plurality of game terminals. Each set has a predetermined number of player numbers. Each number is selected from a predetermined set. The method also comprises determining the plurality of winners of the game by conducting iterative drawing rounds until the number of winners exceeds a winner threshold. Each drawing round comprises: selecting a set of random numbers, the number of random numbers in the set of random numbers being equal to the number of player numbers in the set of player numbers; and identifying as winners any sets of player numbers in which each player number of the set corresponds to one or more of the random numbers selected in either the current drawing round or any previous drawing rounds.

21 Claims, 13 Drawing Sheets

(56) References Cited

U.S. PATENT DOCUMENTS

| | | |
|---|---|---|
| 2002/0151344 A1 | 10/2002 | Tanskanen |
| 2003/0190959 A1 | 10/2003 | Olson |
| 2004/0242320 A1 | 12/2004 | Jackson |
| 2005/0075158 A1 | 4/2005 | Walker et al. |
| 2005/0227756 A1* | 10/2005 | Kane et al. .................. 463/25 |
| 2007/0043584 A1* | 2/2007 | Waters ............................ 705/1 |
| 2007/0060320 A1* | 3/2007 | Kelly et al. .................... 463/27 |
| 2007/0191086 A1 | 8/2007 | Huang |
| 2007/0287520 A1 | 12/2007 | Nalker |
| 2008/0254854 A1* | 10/2008 | Slomiany et al. ............. 463/19 |
| 2009/0176549 A1 | 7/2009 | Saig et al. |
| 2009/0264176 A1* | 10/2009 | Walker et al. .................. 463/17 |
| 2010/0113124 A1 | 5/2010 | Amirsadri |
| 2010/0184502 A1* | 7/2010 | Holch ............................ 463/12 |

OTHER PUBLICATIONS

National Sport Lottery, "*Game Rules*", www.superloto.by/en/rules, copyright 2009, printed Jan. 12, 2011 in 2 pages.

European Examination Report issued in European Application No. 10 17 9 614, dated Mar. 22, 2011, in 3 pages.

Partial European Search Report issued in European Application No. 10 17 9 614, dated Mar. 9, 2011, in 5 pages.

* cited by examiner

MULTI-DRAW GAME SYSTEM

FIELD OF THE INVENTION

The present invention relates to game systems and, more particularly, to a multi-draw game system.

BACKGROUND OF THE INVENTION

Traditional lottery-style game systems allow players to compete for a prize. The prize is often selected from a prize pool which is comprised of a portion of an entrance fee taken from each player.

Such systems however, require large infrastructure and large resources to maintain and operate. Accordingly, there is a need for improved game systems.

SUMMARY OF THE INVENTION

In one aspect, the present application describes a method of selecting a plurality of winners of a game. The method comprises: a) receiving at a game server, a plurality of sets of player numbers from a plurality of game terminals, each set having a predetermined number of player numbers, each player number being selected from a predetermined game number set; b) determining the plurality of winners of the game by conducting iterative drawing rounds until the number of winners exceeds a winner threshold, wherein each drawing round comprises: (i) selecting a set of random numbers, the number of random numbers in the set of random numbers being equal to the number of player numbers in the set of player numbers; and (ii) identifying as winners any sets of player numbers in which each player number of the set corresponds to one or more of the random numbers selected in either the current drawing round or any previous drawing rounds. The method further comprising c) sending a result indication to the plurality of game terminals.

In another aspect, the present application describes a game server for selecting a plurality of winners of a game. The game server comprises: a communications subsystem for communicating with a plurality of game terminals; and a winner identification subsystem for identifying the winners of a game, the winner identification subsystem being configured to: a) receive at a game server, a plurality of sets of player numbers from a plurality of game terminals, each set having a predetermined number of player numbers, each player number being selected from a predetermined game number set; b) determine the plurality of winners of the game by conducting iterative drawing rounds until the number of winners exceeds a winner threshold, wherein each drawing round comprises: (i) selecting a set of random numbers, the number of random numbers in the set of random numbers being equal to the number of player numbers in the set of player numbers; and (ii) identifying as winners any sets of player numbers in which each player number of the set corresponds to one or more of the random numbers selected in either the current drawing round or any previous drawing rounds; and c) send a result indication to the plurality of game terminals.

In yet another aspect, the present application describes a method of providing results on a game terminal comprising: a) receiving, from an input mechanism associated with the game terminal, a selection of a set of player numbers; b) transmitting the set of player numbers to a game server; c) receiving a result indication from the game server, the result indication indicating the result of the game, the result indication including a plurality of sets of random numbers, each set of random numbers being associated with a separate drawing round; and d) displaying, on a display screen associated with the game terminal, an indication of the received results.

In yet a further aspect, the present application describes a game terminal comprising: a communications subsystem; an input mechanism; and one or more processor connected to the communication subsystem and the input mechanism, the one or more processor being configured to: a) receive, from an input mechanism associated with the game terminal, a selection of a set of player numbers; b) transmit the set of player numbers to a gaming server; c) receive a result indication from the gaming server, the result indication indicating the result of the game, the result indication including a plurality of sets of random numbers, each set of random numbers being associated with a separate drawing round; and d) display, on a display screen associated with the game terminal, an indication of the received results.

Other aspects and features of the present application will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present application, and in which.

Similar reference numerals are used in different figures to denote similar components.

DESCRIPTION OF SPECIFIC EMBODIMENTS

The embodiments discussed in the present disclosure are not limited to any particular game terminal architecture, game server architecture, or programming language.

Figure 1:
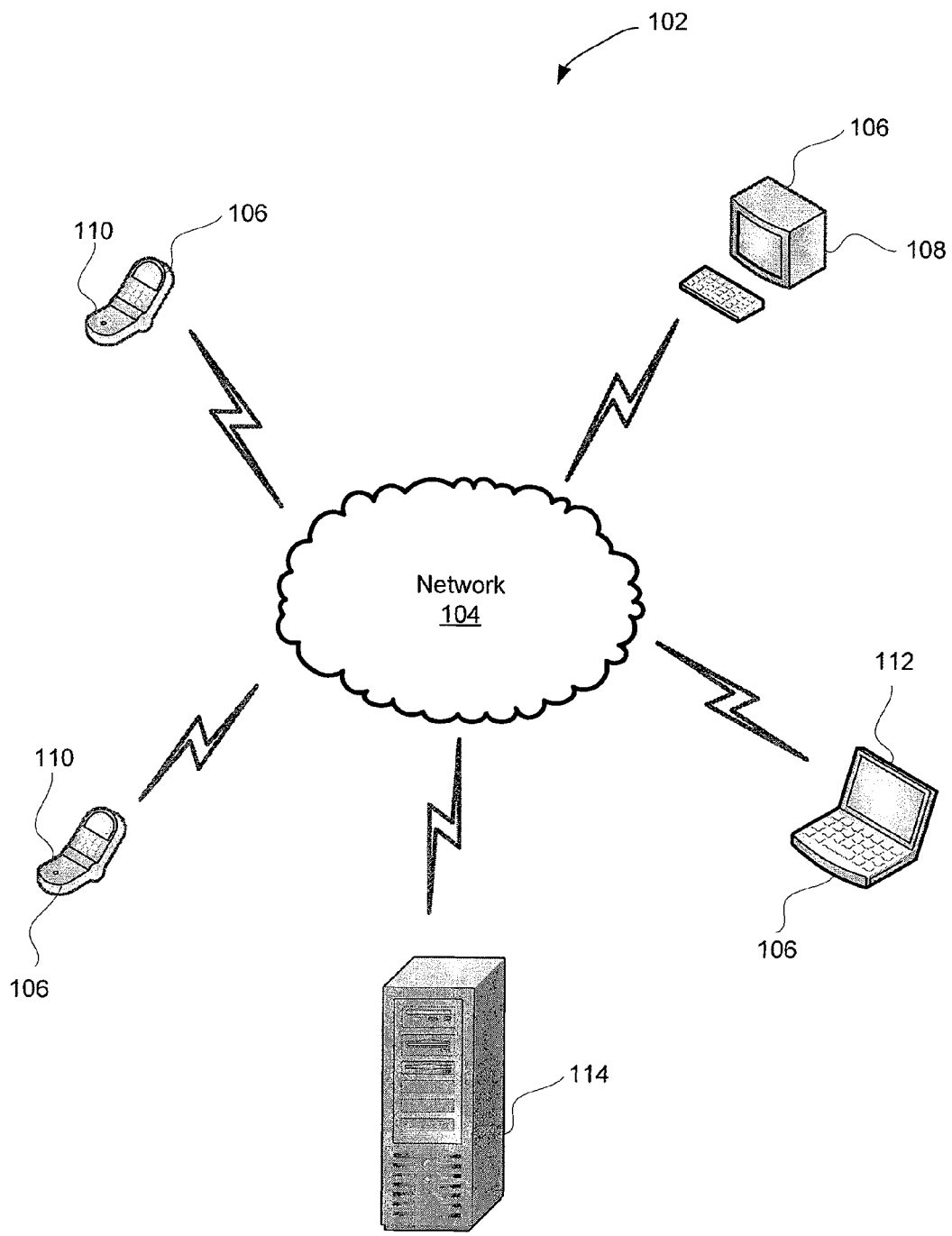
FIG. 1 shows a system diagram illustrating a possible environment in which embodiments of the present application may operate.

Reference is first made to FIG. 1, which illustrates a system diagram illustrating a possible environment in which embodiments of the present application may operate. A game system 102 is comprised of one or more game servers 114 which are connected to one or more game terminals 106 through a communication network 104.

The game terminals 106 are user-operable devices which permit a user to interact with the game server 114 and which are located remote from the game server 114. As will be described in greater detail below, the game terminals 106 may, among other things, allow a user to enter a game hosted by the game server 114 such as a lottery-type game and permit a user to receive and view the results of the game. For example, the game terminals 106 may display a result to the user of that game terminal 106 which indicates whether the user has won or lost the game.

The game terminals 106 may be, by way of example a mobile communication device 110 such as a smartphone or a mobile phone, a personal computer (such as a desktop computer 108, or a portable computer 112), or a personal digital assistant (PDA) equipped for communications.

As will be described in greater detail below, the game server 114 may be used to determine winners of the game (such as the winners of a lottery-type game) and to communicate a result indication to the game terminals 106 to inform the game terminals 106 of the result of the game.

The game terminals 106 may be connected to the game server 114 according to a number of different methods. In some embodiments, the game terminals may be connected through the network 104. The network 104 may be comprised of a Wireless Wide Area Network (WWAN), A Wireless Local Area Network (WLAN), the Internet, a Local Area Network (LAN), or any combination of these network types. Other types of networks are also possible and are contemplated by the present disclosure.

The game terminals 106 may be connected to the network 104 through wired or wireless connectors (not shown). For example, in some embodiments the game terminals 106, are connected through a wireless access point which may be, for example, a Wi-Fi access point. In some embodiments, the network 104 may be comprised of a cellular network such as, for example, a code division multiple access (CDMA) network. By way of example and not limitation, the network 104 may be comprised of other wired or wireless technologies including, for example, Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), and Integrated Digital Enhanced Network (iDEN).

Figure 2:
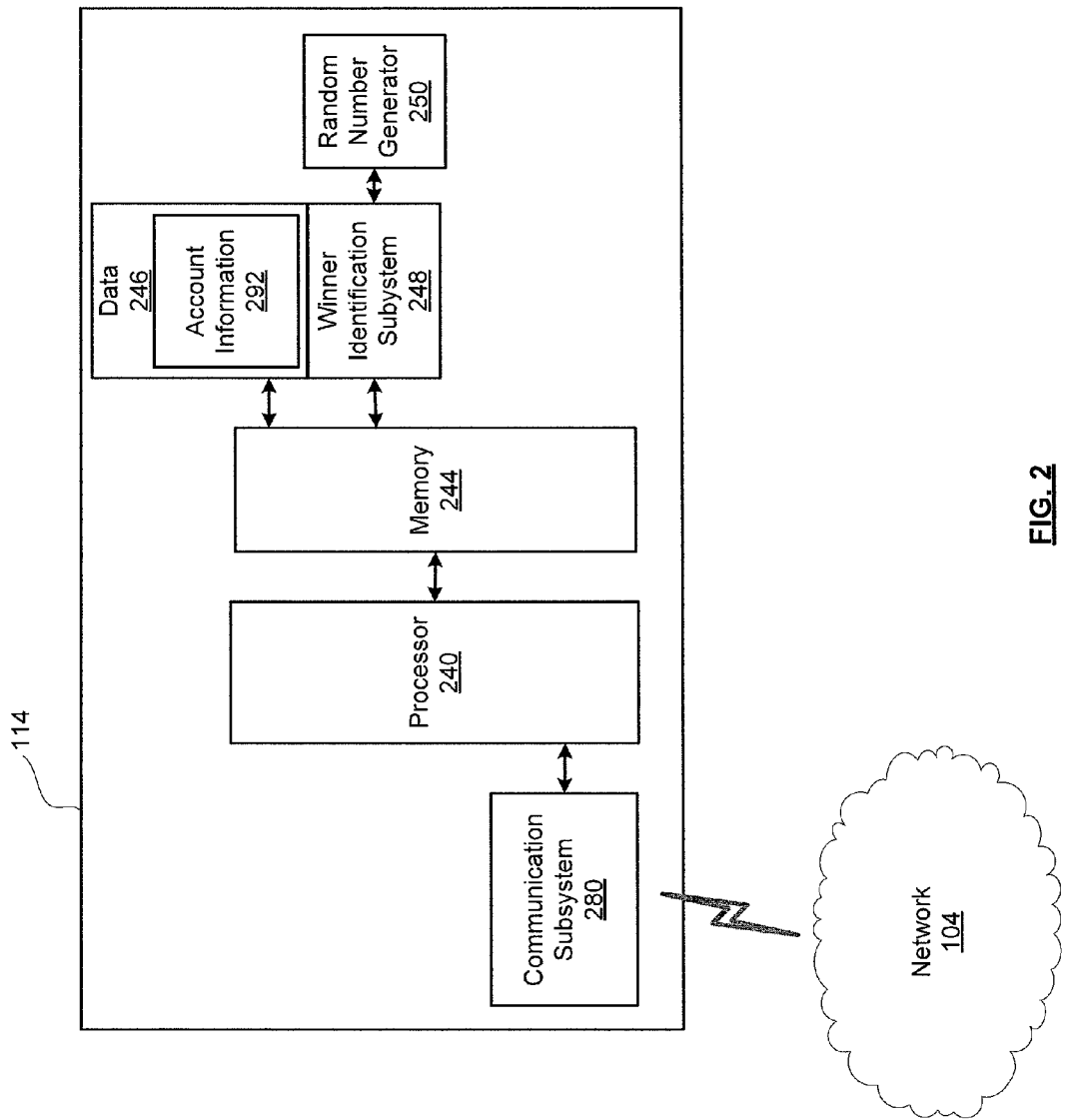
FIG. 2 shows a block diagram of a game server in accordance with an embodiment of the present disclosure.

Referring now to FIG. 2, a block diagram of a game server 114 is illustrated in accordance with some embodiments of the present disclosure. The game server 114 includes a controller comprising one or more processor 240 which controls the overall operation of the game server 114. The game server 114 also includes memory 244 which is connected to the processor 240 for receiving and sending data to the processor 240. While the memory 244 is illustrated as a single component, it will typically be comprised of multiple memory components of various types. For example, the memory 244 may include Random Access Memory (RAM), Read Only Memory (ROM), a Hard Disk Drive (HDD), Flash Memory, or other types of memory. It will be appreciated that each of the various memory types will be best suited for different purposes and applications.

The processor 240 may operate under stored program control and may execute software modules stored on the memory 244. The software modules may be comprised of, for example, a winner identification subsystem 248 which may be used to select one or more winners of a game.

In game servers 114 associated with a lottery-type game, the winner identification subsystem 248 may be associated with a random number generator 250 which may be used to generate random numbers which are used to determine the winners of the game. The random number generator 250 may be a hardware or software based random number generator.

The software modules, such as the winner identification subsystem 248 may temporarily be loaded into volatile memory such as RAM. It will be appreciated by one skilled in the art that any assignments of functions to specific types of memory discussed herein are merely exemplary and that other memory assignments may also be used.

The memory 244 may also store data 246. The data 246 may, in some embodiments, include account information 292 for various users of the system. The account information 292 may, for example, be comprised of a plurality of user profiles forming records in a database. Each user profile may comprise any one or a combination of: a user name or other identifier, one or more passwords associated with the user, favorite numbers associated with the user, an account balance associated with the user, contact information associated with the user, the user's history of game play, and other information describing a user or their preferences.

The game server 114 further comprises a communication subsystem 280. The communication subsystem 280 communicates with the processor 240 and connects the game server 114 to the network 104. The communication subsystem 280 receives data from the network 104 and passes at least some of the received data to the processor 240. The communication subsystem 280 also receives data from the processor 240 and transmits that data to the network 104 if instructed to do so by the processor 240.

It will be appreciated that the game server 114 will be comprised of other features and components not specifically discussed herein. By way of example and not limitation, the game server 114 may include an audio interface which is used to provide an audio output to a user, an input mechanism which is used to receive input from a user and a power unit such as a battery, which is used to provide electrical power to the game server 114 and its components.

Figure 3:
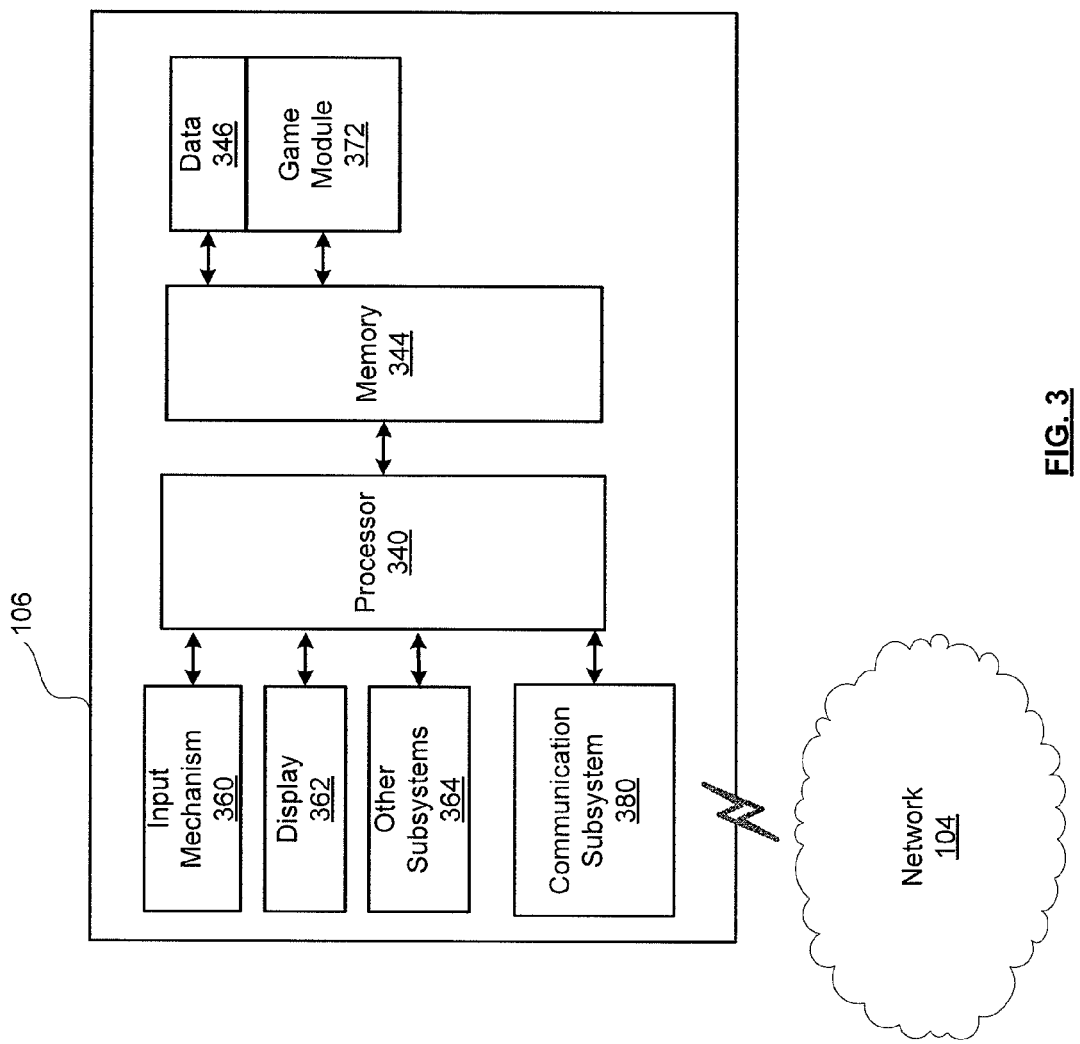
FIG. 3 shows a block diagram of a game terminal in accordance with an embodiment of the present disclosure.

Referring now to FIG. 3, a block diagram of a game terminal 106 is illustrated in accordance with some embodiments of the present disclosure. The game terminal 106 includes a controller comprising one or more processor 340 which controls the overall operation of the game terminal 106. The game terminal 106 also includes memory 344 which is connected to the processor 340 for receiving and sending data to the processor 340. While the memory 344 is illustrated as a single component, it will typically be comprised of multiple memory components of various types. For example, the memory 344 may include Random Access Memory (RAM), Read Only Memory (ROM), a Hard Disk Drive (HDD), Flash Memory, or other types of memory. It will be appreciated that each of the various memory types will be best suited for different purposes and applications.

The processor 340 may operate under stored program control and may execute software modules stored on the memory 344. The software modules may be comprised of, for example, a game module 372 which may permits a user to play a game hosted by the game server 114 of FIGS. 1 and 2. The game module 372 may, among other things, permit a user of the game terminal 106 to enter a game hosted by the game server 114 and to select a set of player numbers for the game. In a manner similar to traditional lottery systems, the player numbers for the game may selected from a predefined game number set. For example, in a six of forty-nine (6/49) game, a player is permitted to select six (6) different numbers from a set of forty-nine (49) possible numbers. The six numbers that are selected by the player are individually referred to as player numbers and collectively referred to as a set of player numbers. The set of all possible numbers from which the player may select numbers (i.e. the 49 numbers) may be referred to as the game number set.

The game module 372 may, among other things: permit a user to input a set of player numbers, transmit that set of player numbers to the game server 114, receive a result indication from the game server 114 indicating the outcome of the game, and/or display the result to a display 362 associated with the game terminal 106. The features and functions of the game module 372 will be described in greater detail below with reference to FIGS. 4 to 11.

The software modules, such as the game module 372 may temporarily be loaded into volatile memory such as RAM. It will be appreciated by one skilled in the art that any assignments of functions to specific types of memory discussed herein are merely exemplary and that other memory assignments may also be used.

The memory 344 may also store data 346. The data 346 may, in some embodiments, include user information such as, for example, the username and/or password associated with the user. Storing the username and/or password associated with the user may be useful in order to permit a user to login and play games on the game server 114 without having to enter login information each time.

The game terminal 106 further comprises a communication subsystem 380. The communication subsystem 380 communicates with the processor 340 and connects the game terminal 106 to the network 104. The communication subsystem 380 receives data from the network 104 and passes at least some of the received data to the processor 340. The communication subsystem 380 also receives data from the processor 340 and transmits that data to the network 104 if instructed to do so by the processor.

The game terminal 106 also includes one or more input mechanism 360. The input mechanism 360 allows a user of the game terminal 106 to interact with the game terminal and to input information and commands to the game terminal 106 which may be received at the processor 340 of the game terminal 106. The input mechanism may be comprised of, for example, any one or more of the following: a scroll button or wheel, push-buttons, a keypad or keyboard, a touchscreen display, a mouse, a trackball, a touchpad, etc.

The game terminal 106 also includes a display 362. The display 362 may be, for example, a liquid crystal display (LCD). The display 362 may be controlled by the processor 340 or by a separate video controller (not shown). The processor 340 may be configured to display information on the display 362 to visually provide information to a user of the game terminal 106.

It will be appreciated that the game terminal 106 will be comprised of other features, components, or subsystems 364 not specifically discussed herein. By way of example and not limitation, the game terminal 106 may include an audio interface which is used to provide an audio output to a user, and a power unit such as a battery, which is used to provide electrical power to the game terminal 106 and its components.

Figure 4:
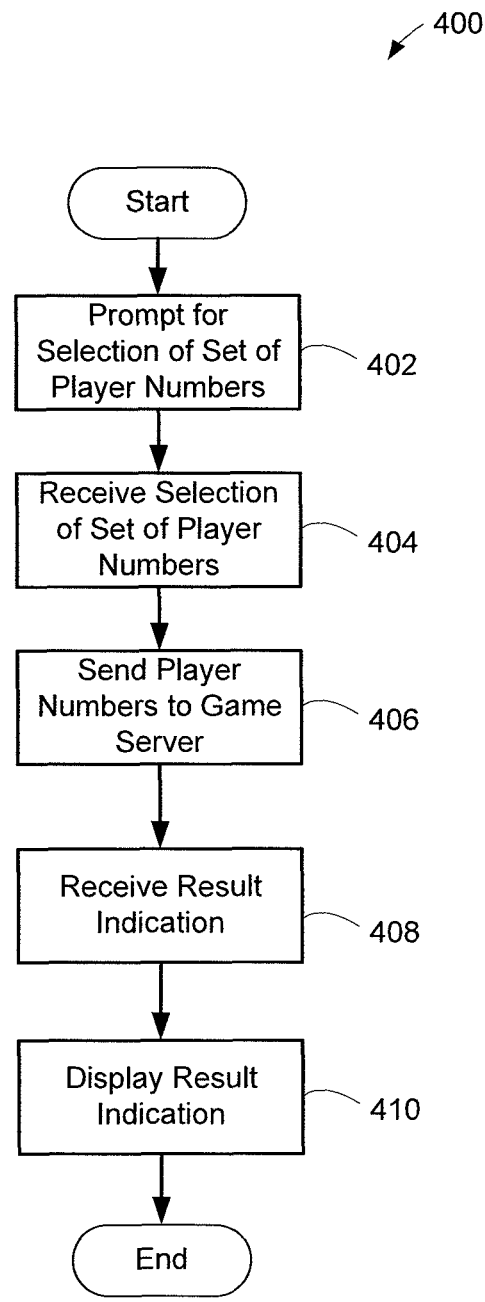
FIG. 4 shows a flowchart of a process for playing a game on a game terminal.

Reference is now made to FIG. 4 which illustrates a process 400 for playing a game on a game terminal 106 in accordance with one embodiment of the present disclosure. The process 400 includes steps or operations which may be performed by the game terminal 106 of FIG. 3. The game module 372 of FIG. 3 may be configured to perform the process 400 of FIG. 4. That is, the game module 372 may contain instructions for causing the processor 340 to execute the process 400 of FIG. 4. Accordingly, the references to game terminal 106 components during the following discussion of FIG. 4 may refer to the components of the game terminal 106 in FIG. 3.

At step 402, the game terminal 106 prompts the user of the game terminal 106 to select a set of player numbers. This prompting may take a variety of forms and will depend on the specific game terminal 106 used. In some embodiments, prompting may include displaying, on the display 362, a display message requesting that the user select a set of player numbers. In other embodiments, an audio-based prompt may be output through a speaker associated with the game terminal 106.

At step 404, the game terminal 106 receives a selection of a set of player numbers. The player numbers are, in at least some embodiments, numbers selected by a user from a larger number set, referred to as the game number set. The larger number set is a set of numbers which is predefined for the particular game which the user is attempting to play. For example in a six from forty-nine (6/49) lottery game, a user selects six (6) different numbers from a set of forty-nine (49) possible numbers. The six numbers that are selected may be referred to as the set of player numbers. Each of the six numbers may, individually, be referred to as player numbers. Each set of player numbers is comprised of a plurality of player numbers. That is, the set of player numbers comprises at least two player numbers.

The player numbers may be received at the game terminal 106 through the input mechanism 360. For example, where the input mechanism 360 includes a numeric keypad, the player numbers may be input using the numeric keypad. Other methods of input are also possible.

Figure 5:
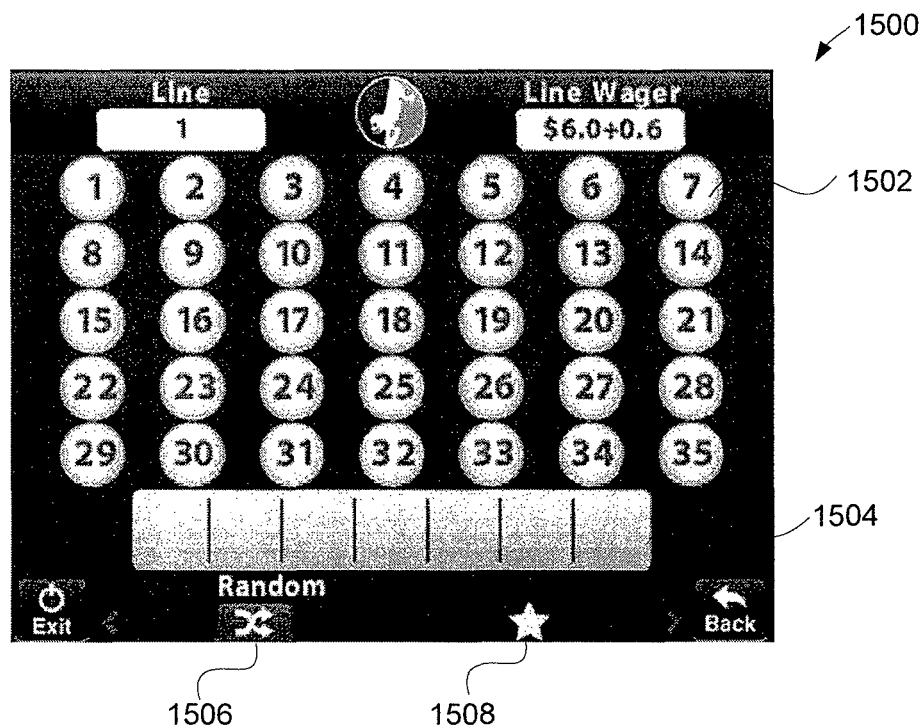
FIG. 5 shows an example screenshot of a player number selection interface in accordance with an embodiment of the present disclosure.

Referring, for a moment, to FIGS. 5 to 8, the steps of prompting for a selection of a set of player numbers (step 402) and receiving a selection of a set of player numbers (step 404) may be implemented, at least in part, with a player number selection interface 1500 which may be displayed on the display 362 of the game terminal 106. Referring first to FIG. 5, a player number selection interface 1500 is displayed for a seven of thirty-five (7/35) game. The player number selection interface 1500 displays a game number set 1502 which, in the example of FIG. 5 includes thirty-five (35) numbers ranging from one (1) to thirty-five (35).

Figure 7:
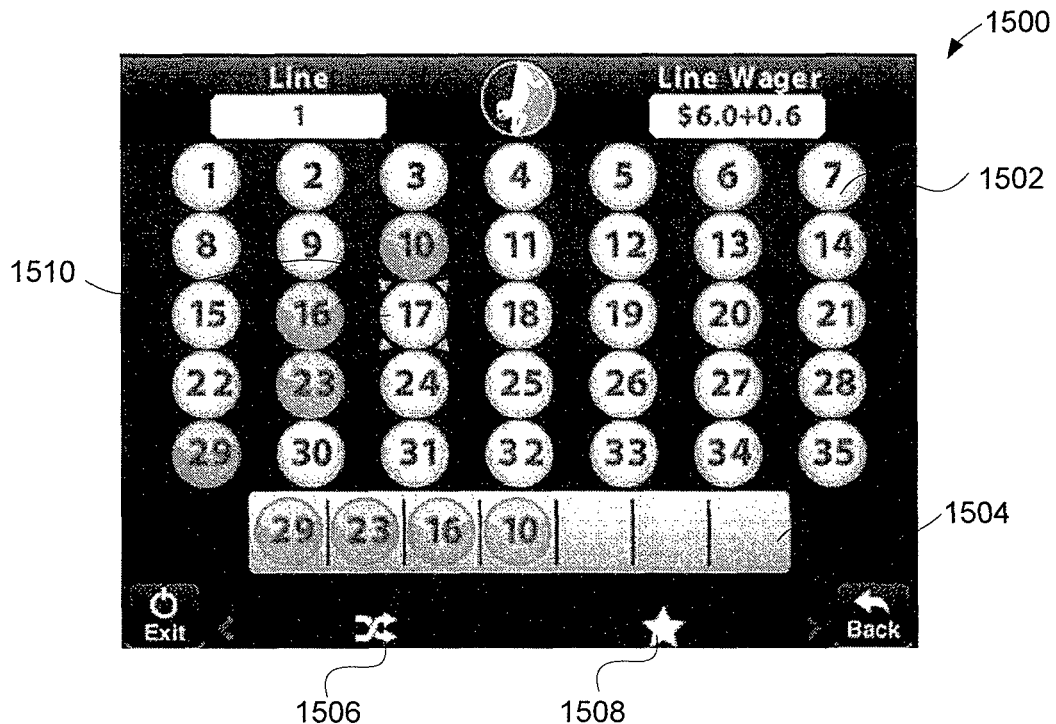
FIG. 7 shows a further example screenshot of a player number selection interface in accordance with an embodiment of the present disclosure.

A user of the game terminal 106 may interact with the input mechanism 360 associated with the game terminal 106 to navigate the player number selection interface 1500. For example, a navigational input mechanism 360, such as a trackball or a mouse, may be used to highlight and select various user-selectable interface elements of the player number selection interface 1500. For example, a user may navigate to one of the numbers of the game number set 1502 and select that number as a player number. As illustrated in FIG. 7, in some embodiments, a caret 1510, or other indicator, may be used to highlight a user-selectable interface element of the player number selection interface 1500, such as a number in the game number set 1502.

As may best be seen from FIG. 7, when a user selects one of the numbers in the game number set 1502 as a desired player number, the player number selection interface 1500 may provide feedback to the user to indicate the selection. In the embodiment shown, the feedback includes highlighting the selected numbers. In the embodiments shown, the feedback also includes populating a selected number field 1504 with the selected numbers. In the example illustrated in FIG. 7, the numbers 29, 23, 16, and 10 have been selected. Accordingly, the numbers 29, 23, 16 and 10 are highlighted and the selected number field 1504 is populated with these numbers.

Referring again to FIG. 5, in some embodiments, the player number selection interface 1500 may include a random number generator interface element 1506. In the example of FIG. 5, the random number generator interface element 1506 has been highlighted by navigating to the random number generator interface element 1506 with the input mechanism 360. The random number generator interface element 1506 interacts with a random number generator (not shown) associated with the game terminal 106. In some embodiments, the random number generator may be provided for in the game module 372 of FIG. 3.

When the random number generator is selected (for example, through the input mechanism 360), the set of player numbers may be populated with randomly generated numbers that are received from the random number generator.

Figure 6:
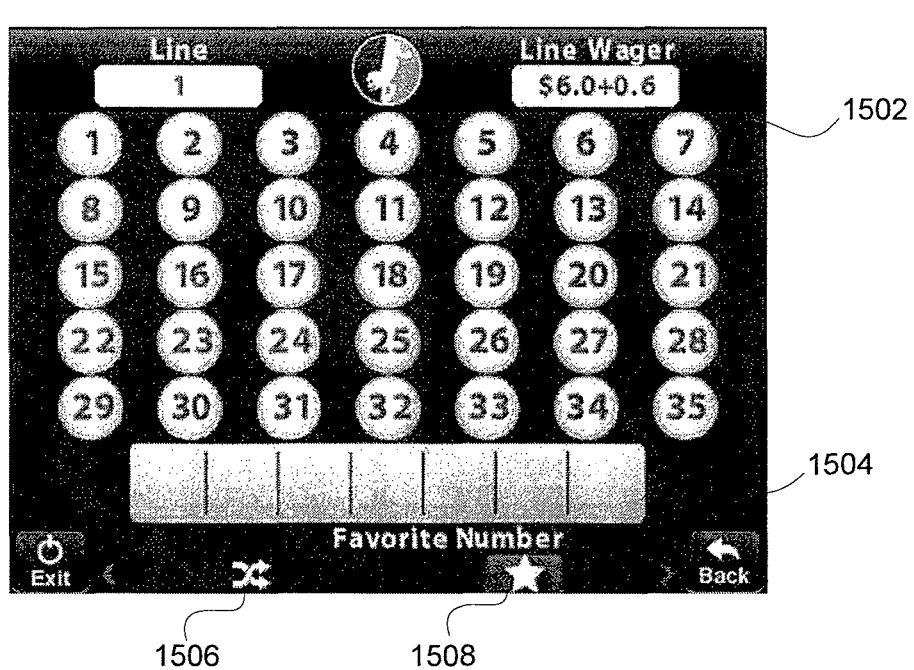
FIG. 6 shows a further example screenshot of a player number selection interface in accordance with an embodiment of the present disclosure.

As illustrated in FIG. 6, in some embodiments, the player number selection interface 1500 may also include a favorite number interface element 1508. In some embodiments, the game terminal 106 may be configured to interface with memory which is used to store one or more favorite sets of numbers associated with a user and to retrieve the favorite set of numbers at step 404. The favorite number interface element 1508 may provide an interface for a user to communicate to the game terminal 106 the user's request to use a favorite set of numbers as their selected set of player numbers for that game. Upon receiving such a request, the game terminal may use the favorite set of numbers as the set of player numbers.

The favorite set of numbers may be stored either locally on the game terminal 106 or at a remote location. For example, in some embodiments, it is stored locally in the memory 344 of the game terminal 106. In other embodiments, the favorite set of numbers may be stored on the game server 114 (FIGS. 1 and 2), for example, in the memory 244 (FIG. 2) of the game server 114. In such embodiments, retrieving the set of player numbers from the game server 114 includes steps of requesting a favorite set of numbers from the game server 114 and a step of receiving the favorite set of numbers from the game server 114.

Figure 8:
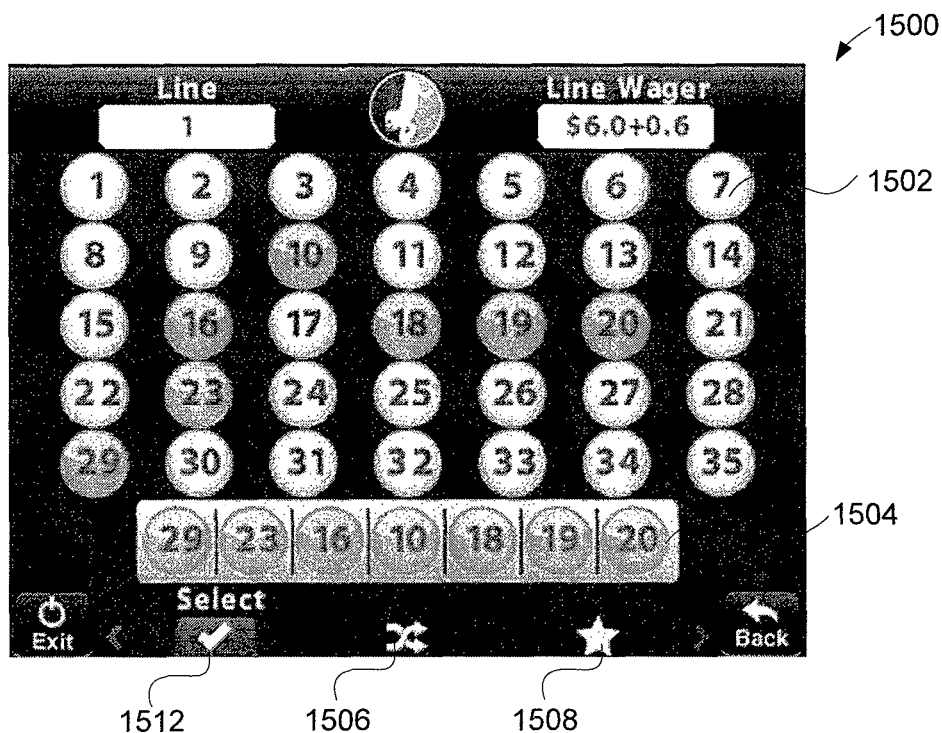
FIG. 8 shows a further example screenshot of a player number selection interface in accordance with an embodiment of the present disclosure.

As illustrated in FIG. 8, once a user has selected a set of player numbers, that set of player numbers may be entered using a final selection interface element 1512. When a user selects the final selection interface element 1512 (for example, using the input mechanism 360), the method of FIG. 4 may continue to step 406.

Other methods of inputting or entering a set of player numbers are also possible.

Referring again to FIG. 4, after a set of player numbers is received by the game terminal 106 (at step 404), at step 406 the set of player numbers may be sent to the game server 114 (FIGS. 1 and 2). That is, the player numbers may be transmitted to the game server 114 from the game terminal 106 using the communication subsystem 380. The set of player numbers may, in some embodiments, be sent along with a game identifier which identifies the game which the set of player numbers is associated with. This may be useful, for example, where the game server 114 operates more than one game. The game identifier is used by the game server 114 to associate the player numbers with a specific game. The game identifier may be, for example, a game ID number.

The set of player numbers may also be sent with a player identifier which may be used by the game server 114 to identify a player, account, or game terminal 106 associated with the set of player numbers.

As will be explained in greater detail below, the game server 114 selects winners of the game based on the set of player numbers. That is, the game server 114 may receive sets of player numbers from a plurality of users and/or game terminals 106. The game server 114 determines which of the sets of player numbers are winning sets of player numbers and which of the sets of player numbers are losing player numbers by performing multiple rounds of drawings. In each drawing round, a set of random numbers are generated from the same set of numbers from with the player numbers were selected. That is, in each drawing round, a set of random numbers is selected from the game number set 1502 (FIG. 5). For example, in the seven of thirty-five (⁷⁄₃₅) example considered above, each set of random numbers would include seven (7) numbers selected from the same set of thirty-five (35) numbers from which the set of player numbers were selected. In each round, winners are determined by identifying any sets of player numbers in which each player number in the set corresponds to random numbers selected in the current drawing round or in any previous drawing round in the same game. The successive drawing rounds continue until the number of winners exceeds a winner threshold. That is, the drawing rounds continue until the number of sets of player numbers that have been identified as winning sets of player numbers exceeds a winner threshold. The winner threshold is at least two or more players. However, the winner threshold may be much larger. By way of example and not limitation, in some embodiments, the winner threshold may be 20 winners. Each selection of a random number in the drawing rounds may be made using a random number generator (RNG) which may be a software based RNG or a hardware based RNG, such as a lottery-type number selector.

It will be appreciated that the game terminal 106 and system 114 described herein, which use multiple rounds of drawings in a single game instance, serve to eliminate the back-and-forth communications that would be associated with traditional gaming systems. In traditional gaming systems, after each draw, the numbers are published and players may select new numbers for a new instance of the game. In contrast, by using the same player numbers in subsequent drawing rounds of the same game, those numbers need to only be communicated to the game server 114 once for multiple drawing rounds. Furthermore, the present disclosure permits all of the winners to be selected more rapidly since the back and forth communications associated with multiple draws on traditional systems are avoided.

At some point after the set of player numbers has been sent to the game server 114, the game server 114 transmits a result indication. The result indication is received at the game terminal 106 at step 408. For example, the result indication may be received at the communication subsystem 380 of the game terminal 106 for processing by the game module 372.

The result indication indicates the result of the game. The result indication includes the set of random numbers that was selected in each drawing round. That is, the result indication includes a plurality of sets of random numbers, each set of random numbers being associated with a separate drawing round.

After the result indication is sent at step 408, the result indicated by the result indication may be displayed on the display 362 associated with the game terminal 106 at step 410. That is, the game module 372 may be configured to cause the display 362 to display the result of the game and/or the result of successive drawing rounds of the game. The displayed result may include, for example, an indication of whether the set of player numbers was selected as a winner of the game. The displayed result may also include an indication of the result of each drawing round and an indication of the player numbers that correspond to random numbers selected in each round.

In some embodiments, the result indication may only be sent by the game server 114 after the game has completed and winners have been selected. That is, the result indication will be sent after winners have been selected and will include the set of random numbers selected in each and every drawing round. The result may then be displayed in a manner which suggests to the user that the set of random numbers are being selected in real-time. That is, selection of the random numbers may be simulated on the display 362. In order to simulate the selection of the random numbers, the game module 372 may be configured to successively show the random numbers selected in each round. That is, the result of each drawing round is iteratively displayed to a user.

In at least some embodiments, the game server 114 and corresponding game terminals 106 each include a synchronization module which allows the simulation of a game to be synchronized on all game terminals 106 participating in the game. That is, the game terminals 106 may synchronize the display of that game on all of the game terminals 106 associated with the game. Each drawing round may be presented at the same time (or at approximately the same time) on each game terminal 106.

In some embodiments, to accomplish the synchronization, the result indication is sent by the game server 114 to the game terminals 106 together with synchronization information. The synchronization information specifies timing data which may be used by the game terminals 106 to determine synchronize the display of the result indication across all game terminals 106.

In some embodiments, the synchronization information may include one or both of a perceived run-time and a perceived start-time. These times may be determined by the game server 114. The perceived start time (PST) is the time at which the display of the simulation of the results is to start. The perceived start time may be calculated by the game server 114 to account for any delay in transmitting the result indication to the game terminals. For example, in some embodiments the perceived start time may be calculated as the sum of the time at which the game was completed on the game server 114 and an assigned propagation buffer. The propagation buffer is a value that compensates for typical delays in communicating results. In some embodiments, the propagation buffer is approximately 10 seconds.

The perceived run time may be calculated by the game server 114 to permit the game terminal 106 to determine the length of the simulation.

In some embodiments, the perceived run time (PRT) may be calculated according to the following equation:

$$PRT = sb + (db*(D-1)) + (nb*N) + eb$$

Where sb is the start buffer, which is a time allocated for an animation before starting the display of the first draw; db is the draw buffer which is the time for an animation or pause between the end of the display of a drawing round and the start of the display of a next subsequent drawing round; D is the number of drawing rounds in the game; nb is the number buffer which is the time between the display of each subsequent random number; N is the number of random numbers selected during the entire course of the game; eb is the end buffer which is used for displaying a win or loss animation at the end of the game.

The perceived run time may be used, by the game terminal 106 to indicate whether a game is "not yet begun", "in progress" or "completed" or any suitable variation of these status indicators. For example, during the period of time prior to the time defined by the PST, a lobby display screen (or other suitable display screen) on the game terminal 106 may display a status indicator to indicate that the game has not yet begun. Between the range of times starting at the PST and ending at perceived end time (PET) (PET=PST+PRT), the game terminal 106 may display a status indicator to indicate that the game is in progress. After the PET, the game terminal 106 may display a status indicator to indicate that the game has completed.

It will be appreciated that other methods of calculating a perceived run time are also possible and that, in some embodiments, a perceived run time need not be calculated in order to synchronize.

In other embodiments (not shown), the result indication may be sent after each drawing round. In such embodiments, results indicating the result of each drawing round are communicated to the game terminal 106, and displayed on the display 362 of the game terminal 106 in near real time.

In either case (i.e. whether results are communicated to the game terminal 106 and displayed on the game terminal 106 in near real time or after-the-fact), the game module 372 may, in at least some embodiments, be configured to indicate which of the player numbers in the set of player numbers correspond to the selected random numbers. For example, the random numbers selected in a first drawing round may be displayed followed immediately by the random numbers selected in a second drawing round, and so on. As the selected random numbers are displayed, any corresponding player numbers may be highlighted (i.e. player numbers that match selected random numbers are highlighted).

That is, after each drawing round the result indicated by the received result indication may be displayed on the display 362. For example, after each drawing round, the numbers drawn in that round may be displayed along with an indication of whether any numbers in the set of player numbers sent by the game terminal 406 corresponds to the numbers selected. An indicator of whether the set of player numbers have won the game may also be displayed. In some embodiments, an indicator of other player results for the game may also be displayed. The indicator of other player results for the game may identify, for example, the number of players who have won after each round, and/or a user ID or name associated with the players who have already won.

Figure 9:
FIG. 9 shows an example screenshot of a result indication display screen in accordance with an embodiment of the present disclosure.
Figure 10:
FIG. 10 shows a further example screenshot of a result indication display screen in accordance with an embodiment of the present disclosure.
Figure 11:
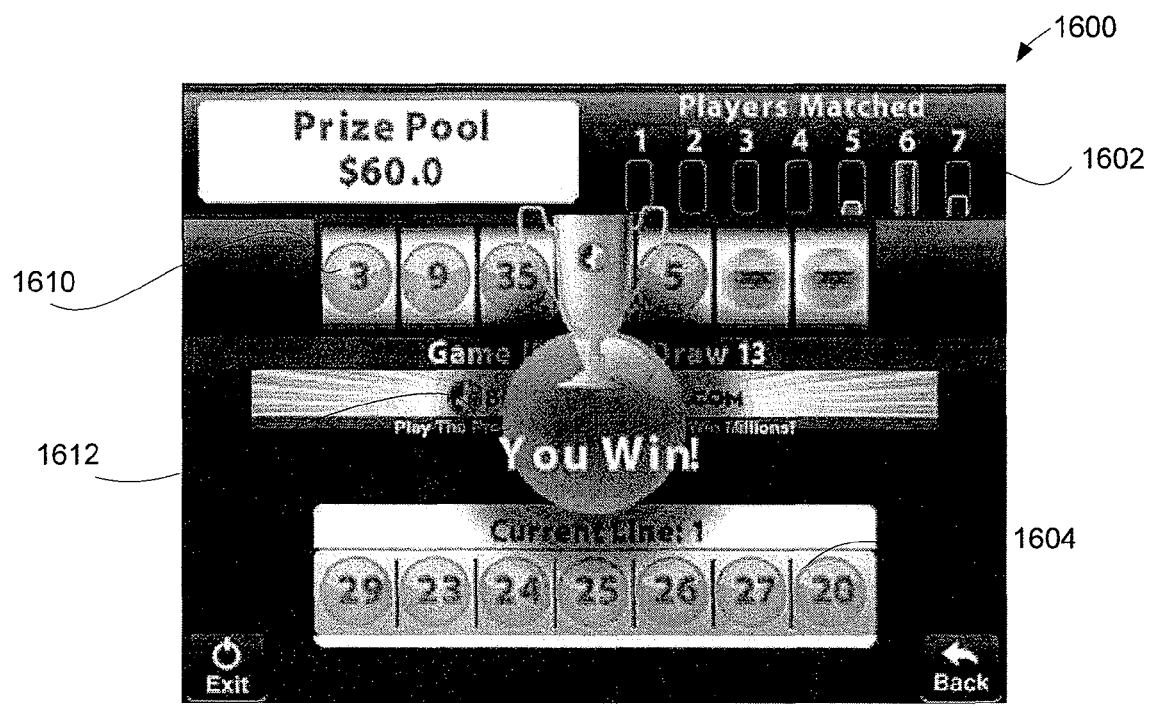
FIG. 11 shows a further example screenshot of a result indication display screen in accordance with an embodiment of the present disclosure.

Referring now to FIGS. 9 to 11, an example result indication display screen 1600 is illustrated in various stages of display. The result indication display screen 1600 of FIGS. 9 to 11 may be used, in at least some embodiments, as part of step 410 of FIG. 4 in which a result is displayed. In FIG. 9, the result indication display screen 1600 is illustrated after a first drawing round in which none of the random numbers selected in that round match the player numbers. FIG. 10 illustrates the result indication display screen 1600 during a second drawing round in which one of the random numbers selected (26) matches a player number (26). FIG. 11 illustrates the result indication display screen 1600 after a thirteenth drawing round. After the thirteenth drawing round, all player numbers have been matched to random numbers selected in one of the drawing rounds.

The result indication display screen 1600 may include a player number display element 1604 which indicates the set of player numbers selected by the user of the game terminal 106.

The result indication display screen 1600 may include an indicator 1602 of other player results. In the example illustrated, the indicator 1602 identifies the number of player numbers that competing players have matched.

The result indication display screen 1600 also includes a current drawing round random number display element 1610 which is configured to display the random numbers selected in the current drawing round. That is, the drawing round random number display element 1610 is configured to display the random numbers associated with the drawing round which is currently being displayed.

As illustrated in FIG. 10, for example, the current drawing round random number display element 1610 may be configured to include a placeholder for random numbers not yet selected (or whose drawing has not yet been simulated on the display). In the example of FIG. 10, the current drawing round random number display element 1610 simulates a rotating display, such as the rotating displays commonly found on slot machines, until a random number is ready for display in the slot occupied by the placeholder. By way of example, the three rightmost portions of the drawing round random number display element 1610 in FIG. 10 include three rotating display placeholders.

As illustrated in FIG. 11, once a final result for the set of player numbers has been determined (that is, whether the set of player numbers are winning player numbers or losing player numbers), that final result may be communicated to the user via a final result display element 1612. In the example illustrated, the final result was that the set of player numbers were winning player numbers since all player numbers corresponded to random numbers drawn in the current drawing round or any preceding drawing round of the game.

Figure 12:
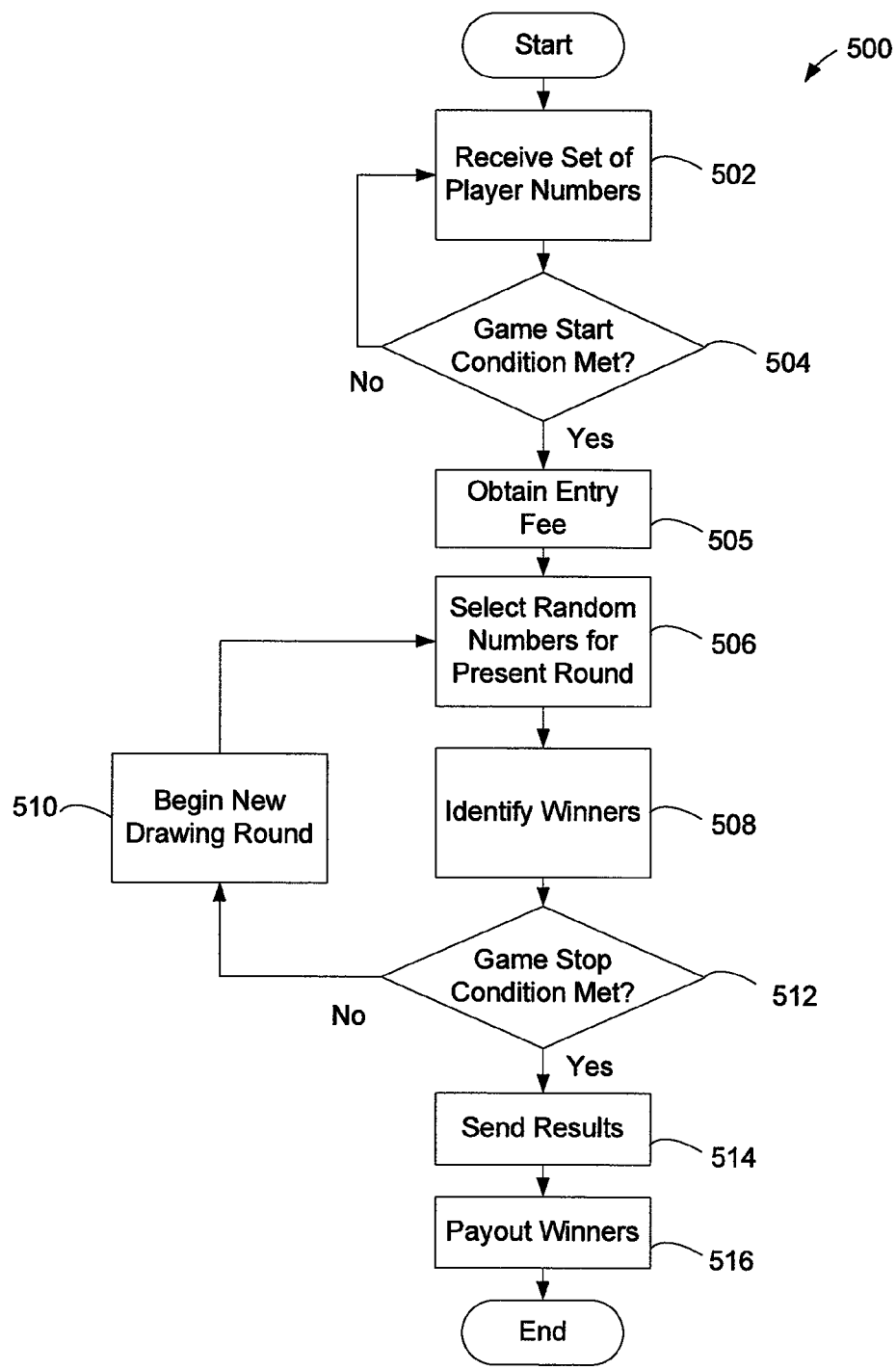
FIG. 12 shows a flowchart of a process of selecting a plurality of winners of a game in accordance with an embodiment of the present disclosure.

Referring now to FIG. 12, a process 500 of selecting a plurality of winners of a game is illustrated in flowchart form. The process 500 includes steps or operations which may be performed by the game server 114 of FIG. 2. The winner identification subsystem 248 of FIG. 2 may be configured to perform the process 500 of FIG. 12. That is, the winner identification subsystem 248 may contain instructions for causing the processor 240 to execute the process 500 of FIG. 12. Accordingly, the references to game server components during the following discussion of FIG. 12 may refer to the components of the game server 114 in FIG. 2.

The process 500 may be performed by the game server 114 between steps 404 and 406 of FIG. 4. That is, the process 500 may begin at step 502 when a set of player numbers (which is transmitted from the game terminal 106 at step 502) is received from the game terminal 106 at the game server 114.

As explained previously, the set of player numbers 106 is a set which includes a predetermined number of player numbers. Each player number has been selected from a game number set.

The game hosted by the game server 114 may be a multiplayer game. Where the game is a multiplayer game, a plurality of sets of player numbers may be received by the game server 114 from a plurality of game terminals 106.

The sets of player numbers may be received until a game start condition is met (step 504). The game start condition may be defined in the winner identification subsystem 248. The game start condition may, in some embodiments, require that a predetermined number of sets of player numbers be received by the game server 114. Such a game start condition will be discussed in greater detail below with reference to FIG. 13. In some embodiments, the game start condition specifies a predefined time at which the game will start. Such a game start condition will be discussed in greater detail below with reference to FIG. 14.

Next, at step 505, in some embodiments an entry fee is obtained by the game server 114. The specific process by which an entry fee is obtained will vary for different embodiments.

Obtaining an entry fee may, in some embodiments, comprise processing a credit card transaction. In other embodiments, it may comprise deducting money from an account.

A portion of the entry fee may be allocated as a service fee, which is collected by the game server 114 for the owner, operator, or manager of the game server 114.

Another portion of the entry fee may be allocated to a main pot which is divided among winners of the game in a predetermined manner.

It will be appreciated that the step 505 of obtaining an entry fee may, in various embodiments, be located at different points of the process 500. For example, in some embodiments, an entry fee is deducted immediately when the set of player numbers is received at step 502. In other embodiments, the entry fee is only deducted after the game has ended and winners have been selected.

It will also be appreciated that, in some embodiments, no entry fee may be obtained. In such embodiments, no entry fee is required to play the game. The game is merely played for the enjoyment of its players.

Once the game has begun, a plurality of winners of the game will be selected by conducting iterative drawing rounds until the number of winners exceeds a winner threshold.

In each drawing round, at step 506, a set of random numbers for that drawing round are randomly selected. For example, the random numbers of the set may be selected using the random number generator 250 of FIG. 2.

It will be appreciated that random number selection may not be truly random. Random number selection may, in at least some embodiments, be pseudorandom. As used herein, the term "random number" is meant to refer to both truly random and pseudorandom numbers.

The random numbers are selected from the same game number set 1502 (FIG. 5) from which the set of player numbers was selected at step 404 of FIG. 4. In at least some embodiments, the number of random numbers in the selected set in each drawing round is equal to the number of player numbers in the set of player numbers received at step 502.

In at least one embodiment, each set of random numbers in a drawing round does not include duplicate numbers. That is, once a number is selected in a drawing round, it cannot be selected as one of the other random numbers in the set of random numbers in the same drawing round. In at least some embodiments, the same random number may be selected in different drawing rounds. That is, the set of the random numbers selected in each drawing round is selected from the same set of numbers (i.e. the game number set).

It will be appreciated that permitting the re-selection of random numbers selected in a previous drawing round may serve a number of purposes. First, it may prolong the game leading to a more enjoyable experience for a user. Second, it prevents a large number of winners from being selected in each round, since the probability of selecting a number which will cause a given set of player numbers to become a winning set is reduced by virtue of the existence of a greater number of selectable numbers in each round.

It will, however, be appreciated that in other embodiments, to provide for faster game-play, random numbers which have been selected in a drawing round may not be selectable in later rounds.

Next, at step 508, the winner identification subsystem 248 will identify, as winners, any sets of player numbers in which each player number of the set corresponds to one or more of the random numbers selected in either the current drawing round or any previous drawing rounds. That is, winners are identified by identifying any of the sets of player numbers received at step 502 in which each player number in that set has a corresponding random number selected in the current drawing round or in any previous drawing rounds.

Next, at step 512, a determination is made as to whether a game stop condition is met. In some embodiments, the game stop condition is a condition that will cause the game to end when the number of winners selected meets or exceeds a predetermined winner threshold. The winner threshold will require that at least two winners be selected. However, in at least some embodiments, two is meant to be a floor and not a ceiling. That is, the minimum winner threshold in most embodiments is two. However, the winner threshold may be much larger. By way of example and not limitation, in some embodiments the winner threshold may be twenty (20) winners.

If the winner threshold (or other game stop condition) is not met, at step 510 a new drawing round is begun.

This process continues until the stop condition of step 512 is met. For example, the process may, in at least some embodiments, continue until the number of winners meets or exceeds the winner threshold.

Next, at step 514, a result indication is sent from the game server 114 to the game terminals 106. The result indication indicates the result of the game. The result indication includes the set of random numbers that was selected in each drawing round. That is, the result indication includes a plurality of sets of random numbers, each set of random numbers being associated with a separate drawing round.

Next, at step 516, the game server 114 pays winners of the game. Winners of the game may be paid by distributing funds in the main pot established at step 505 (where such a main pot has been established). The funds may be distributed according to a predetermined payment schedule which allocates a larger portion of the main pot to winners drawn in an earlier round than is allocated to winners drawn in a later round. The step 516 may include a step of crediting an account associated with the player.

It will be appreciated that, in other embodiments non-monetary prizes may be awarded to winners. By way of example and not limitation, the prizes may be tournament tokens, allowing the winner to enter another game or tournament, points, etc.

In the embodiments illustrated in FIG. 12, the result indication is only sent after a final drawing round, which occurs after the number of winners exceeds a threshold. That is, the result indication will be sent after winners have been selected and will include the set of random numbers selected in each and every drawing round.

In other embodiments (not shown), the result indication may be sent to the game terminal 106 after each drawing round. In such embodiments, results, indicating the result of each drawing round, are communicated to the game terminal 106, and displayed on the display 362 of the game terminal 106 in near real time.

Figure 13:
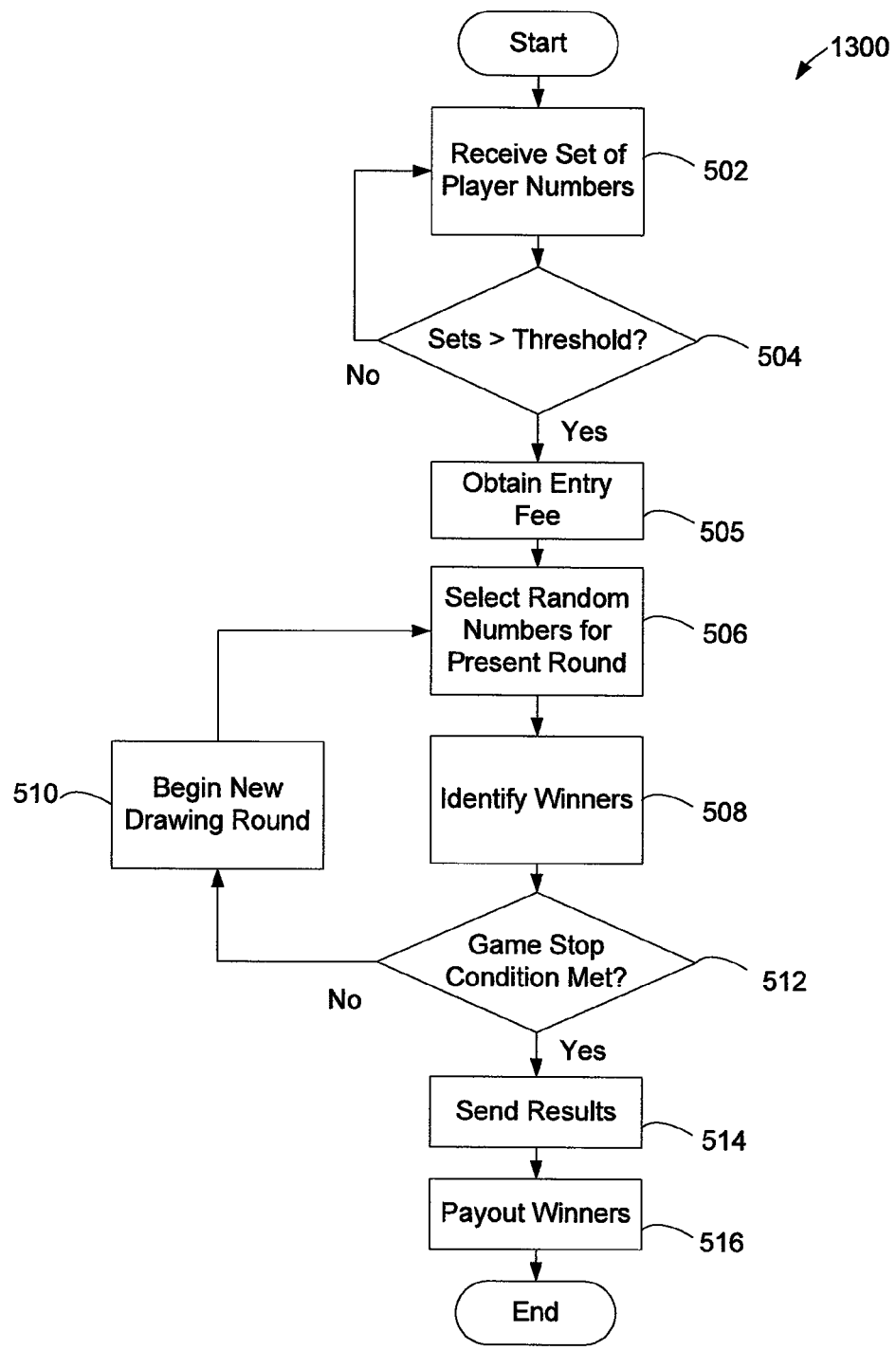
FIG. 13 shows a flowchart of a process of selecting a plurality of winners of a game in accordance with another embodiment of the present disclosure.

Referring now to FIG. 13, a process 1300 of selecting a plurality of winners of a game is illustrated in flowchart form. The process 1300 includes steps or operations which may be performed by the game server 114 of FIG. 2. The winner identification subsystem 248 of FIG. 2 may be configured to perform the process 1300 of FIG. 13. That is, the winner identification subsystem 248 may contain instructions for causing the processor 240 to execute the process 1300 of FIG. 13. Accordingly, the references to game server components during the following discussion of FIG. 13, may refer to the components of the game server 114 in FIG. 2.

The process 1300 of FIG. 13 represents an embodiment in which the game only starts when a predetermined number of sets of player numbers have been received at the game server 114. This embodiment may be referred to, for example, as a pick-and-go embodiment. This embodiment may be useful in some applications since it permits a game to be run immediately, as long as there are enough players. This serves to reduce the overhead associated with the storage of lottery game information (such as sets of player numbers) on the game server 114, since such information need only be stored until there are enough players to run the game.

The process 1300 of FIG. 13 includes the steps of the process 500 of FIG. 12 except in that the step 504 (FIG. 12) of determining whether a game start condition is met has been replaced with a step 503 (FIG. 13) of determining whether the number of sets of player numbers received is greater than a predefined threshold.

If the number of sets of player numbers received is, in fact, greater than the predefined threshold, then the game will commence and winners of the game will be selected. If not, then the game server 114 waits for the number of sets of player numbers received to exceed the threshold.

Figure 14:
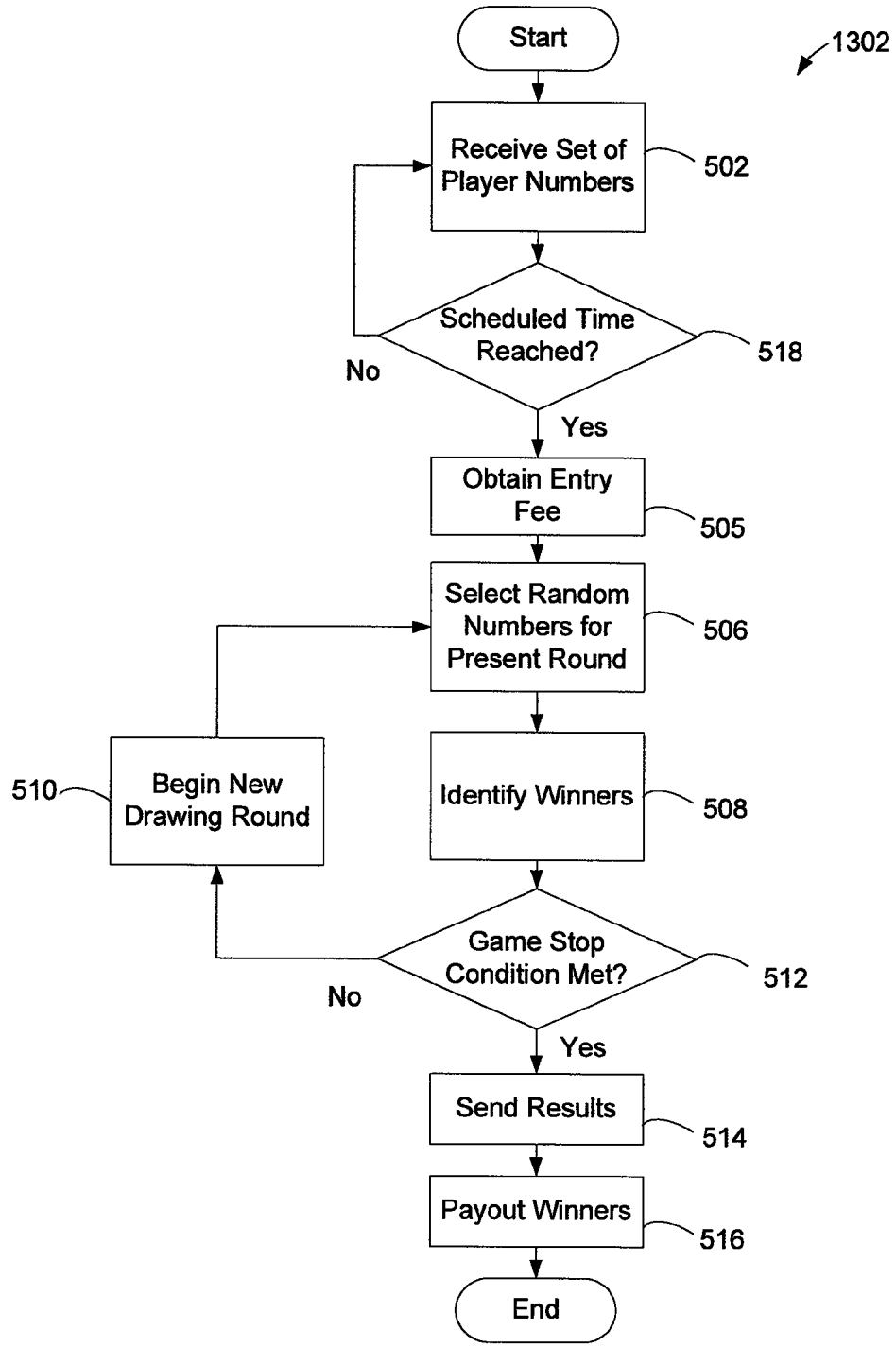
FIG. 14 shows a flowchart of a process of selecting a plurality of winners of a game in accordance with another embodiment of the present disclosure.

Referring now to FIG. 14, a process 1302 of selecting a plurality of winners of a game is illustrated in flowchart form. The process 1302 includes steps or operations which may be performed by the game server 114 of FIG. 2. The winner identification subsystem 248 of FIG. 2 may be configured to perform the process 1302 of FIG. 14. That is, the winner identification subsystem 248 may contain instructions for causing the processor 240 to execute the process 1302 of FIG. 14. Accordingly, the references to game server components during the following discussion of FIG. 14 may refer to the components of the game server 114 in FIG. 2.

The process 1302 of FIG. 14 represents an embodiment in which the game only starts at a scheduled time. This embodiment may be referred to, for example, as a scheduled-game embodiment.

The process 1302 of FIG. 14 includes all of the steps of the process 500 of FIG. 12 except in that the step 504 (FIG. 12) of determining whether a game start condition is met has been replaced with a step 518 (FIG. 14) of determining whether the scheduled time has been reached.

If the scheduled time has been reached, then the game will commence and winners of the game will be selected. If not, then the game server 114 waits for the scheduled time to be reached.

In some embodiments, the game hosted by the game server 114 may include a side game, which is a game that is played using the same set of player numbers as the main game discussed above, but under a different set of rules that the main game. That is, the side game operates as a mini-game within the larger main game.

As will be explained in greater detail below, in at least some embodiments, the main game is a multi-draw game (such as the game discussed above) in which a winner is determined by comparing both random numbers selected in a present drawing round and random numbers selected in any preceding drawing rounds of the same instance of the game to the set of player numbers selected by the player and received at the game server 114. The side game may be a single-draw game in which a winner is determined by comparing only the random numbers selected in the present drawing round to the set of player numbers selected by the player and received at the game server 114. In some embodiments, a side game may be won if a set of player numbers or if a predetermined number of numbers in that set are selected in a single drawing round.

The prizes awarded to winners of the main game and the side game may differ. That is, the winners of the main game may receive prizes from a main pot and winners of the side game may receive prizes from a side pot. The side pot may be taken from a different pool of funds than the main pot. For example, in some embodiments, the side pot is a progressive side pot which includes a progressive game entry fee taken from every side game player in the current game instance and in other game instances of the same or similar games. For example, the progressive pot may include all or a portion of progressive game entry fees taken from every progressive game player since the last progressive pot was won.

In contrast, the main pot may be comprised of funds from only the present game instance.

In some embodiments, the progressive pot may be statistically determined to obtain desired payout odds. That is, the progressive pot may not be taken directly from progressive game entry fees, but rather calculated so that over time a desired portion of the progressive game entry fees will be paid out.

Figure 15:
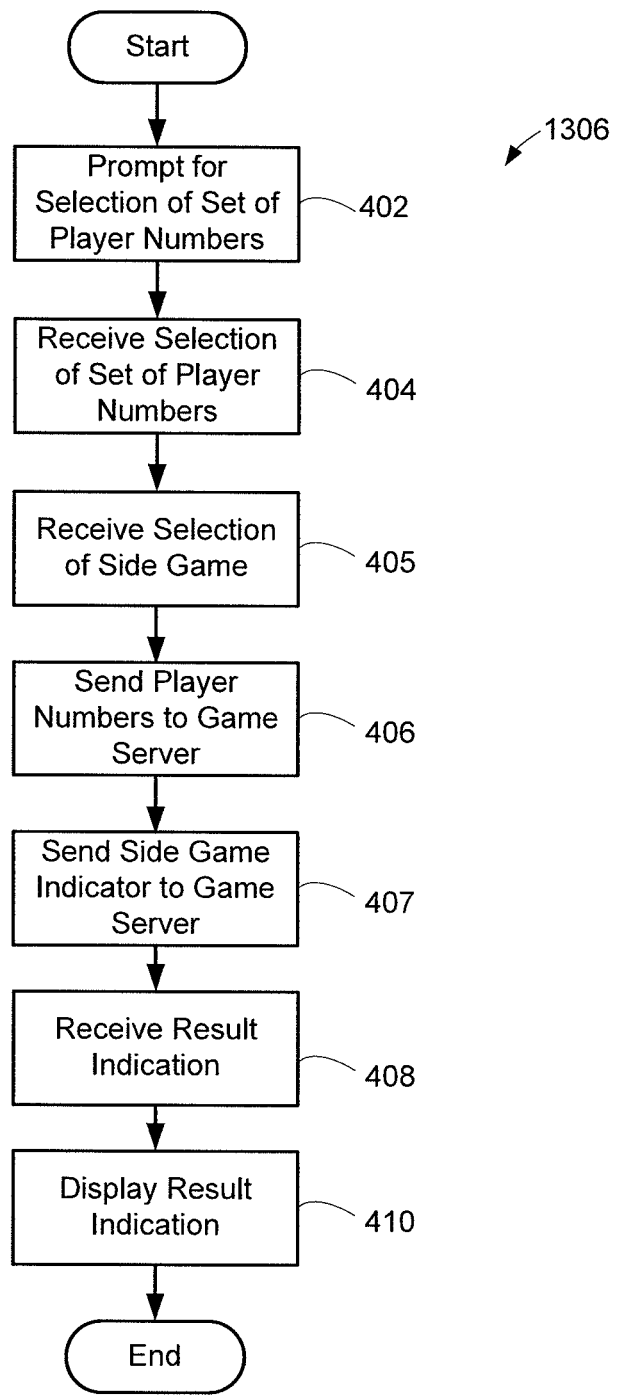
FIG. 15 shows a flowchart of a process for playing a game on a game terminal in accordance with another embodiment of the present disclosure.

An overview of a dual-game embodiment having been provided, reference is now made to FIG. 15 which illustrates a process 1306 for playing a dual-game on a game terminal 106 in accordance with one embodiment of the present disclosure. The process 1306 includes steps or operations which may be performed by the game terminal 106 of FIG. 3. The game module 372 of FIG. 3 may be configured to perform the process 1306 of FIG. 15. That is, the game module 372 may contain instructions for causing the processor 340 to execute the process 1306 of FIG. 15. Accordingly, the references to game terminal 106 components during the following discussion of FIG. 15 may refer to the components of the game terminal 106 in FIG. 3.

The embodiment of FIG. 15 permits a user to participate in both a main game and an optional side game.

The process 1306 of FIG. 15 is similar to the process of FIG. 4. The process 1306 of FIG. 15 beings with the step 402, in which the game terminal 106 prompts the user of the game terminal 106 to select a set of player numbers. This step is explained in greater detail above in relation to FIGS. 4 to 8.

Next, at step 405, the game terminal 106 may receive, from an input mechanism 360 associated with the game terminal 106, an input indicating whether the user wishes to participate in a side game. The received side game selection may be an indication of whether the user wishes to participate in a side game which operates under a different set of rules than the main game. The side game may have an additional fee associated with it, but may rely on the same set of player numbers as the main game.

Next, at step 406, the selected set of player numbers are sent to a game server 114 which hosts the game. This step is explained in greater detail above in the discussion of FIG. 4.

At step 407, a side game indicator may also be sent to the game server 114. The side game indicator is used to indicate to the game server 114 whether or not the side game will be played. It will be appreciated that the side game indicator will only be sent in embodiments in which the side game is optional.

At some point after the set of player numbers has been sent to the game server 114, the game server 114 transmits a result indication. The result indication is received at the game terminal 106 at step 408. For example, the result indication may be received at the communication subsystem 380 of the game terminal 106 for processing by the game module 372. In the embodiment of FIG. 15, the result indication may indicate both the outcome of the main game and the outcome of the side game. That is, the result indication may indicate whether the user has won the main game and whether the user has won the side game. As in the embodiment of FIG. 4, the result indication may include the set of random numbers that was selected in each drawing round.

Next, at step 410, the result indicated by the result indication may be displayed on the display 362 associated with the game terminal 106. This step 410 may include any or all of the features of this step discussed above with regard to FIG. 4 and FIGS. 9 to 11 and may additionally include a step of displaying a result of the side game (i.e. whether the user has won the side game).

Figure 16:
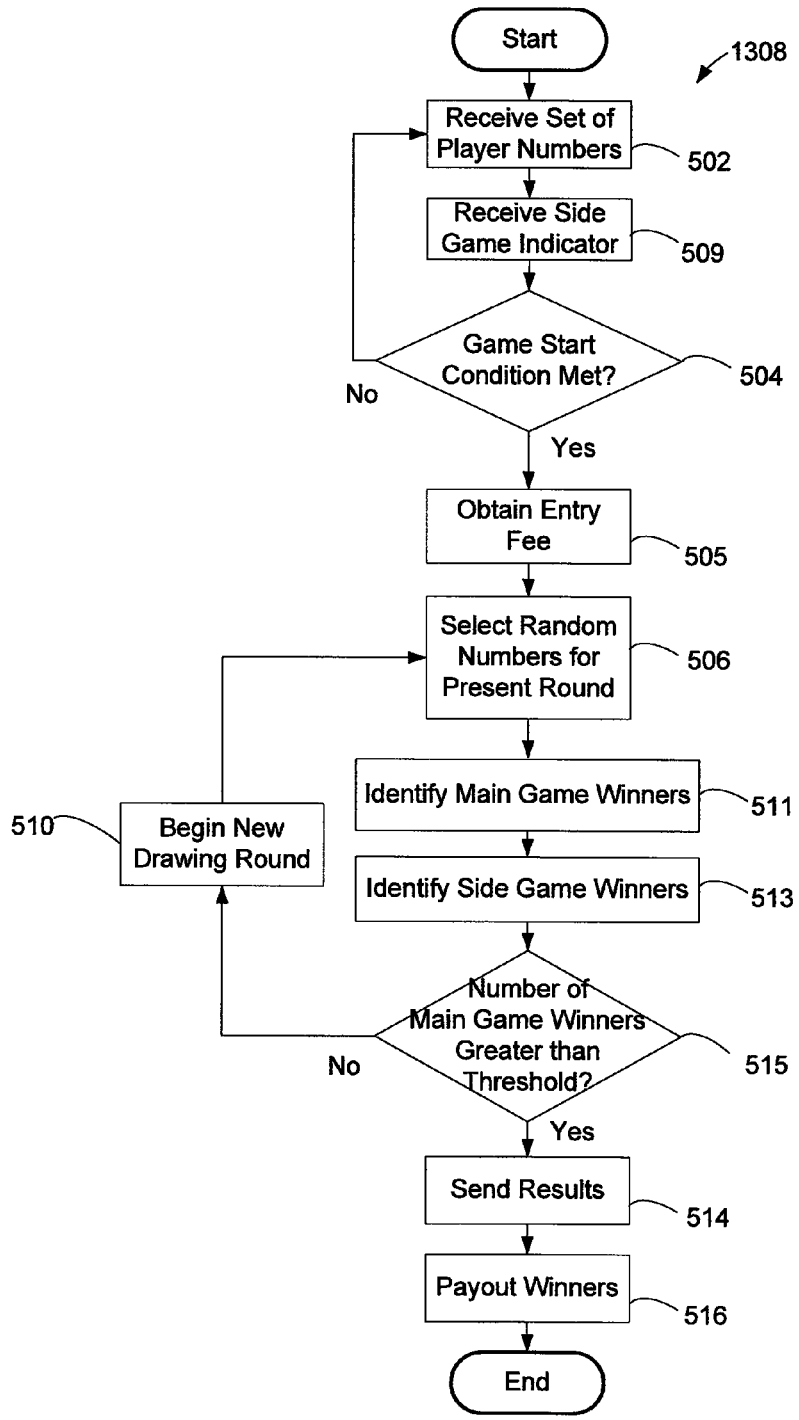
FIG. 16 shows a flowchart of a process of selecting a plurality of winners of a game in accordance with another embodiment of the present disclosure.

Referring now to FIG. 16, a process 1308 of selecting a plurality of winners of a game is illustrated in flowchart form. The process 1308 includes steps or operations which may be performed by the game server 114 of FIG. 2. The winner identification subsystem 248 of FIG. 2 may be configured to perform the process 1308 of FIG. 16. That is, the winner identification subsystem 248 may contain instructions for causing the processor 240 to execute the process 1308 of FIG. 16. Accordingly, the references to game server components during the following discussion of FIG. 16, may refer to the components of the game server 114 in FIG. 2.

At step 502, a set of player numbers are received at the game server 114 from a game terminal 106. Step 502 is discussed in greater detail above in the discussion of FIG. 12.

Next, at step 509, a side game indicator is received at the game server 114. The side game indicator is used to communicate to the game server 114 whether the user of the game terminal 106 wishes to also take part in the optional side game.

Next, at step 504, a determination is made as to whether a condition is met that will cause the game to start. This step 504 is discussed in greater detail above in relation to FIG. 12.

Next, at step 505, an entry fee for the game is obtained. The entry fee may, for example, be obtained by debiting an account associated with the game terminal 106 from which the set of player numbers were received. If the side game indicator received at step 509 indicates that the user wishes to take part in the side game, the entry fee may include both a fee associated with the main game and a fee associated with the side game.

Once the game has begun, a plurality of winners of the game will be selected by conducting iterative drawing rounds until the number of winners of the main game exceeds a winner threshold.

In each drawing round, at step 506, a set of random numbers for that drawing round are randomly selected. For example, the random numbers of the set may be selected using the random number generator 250 of FIG. 2. This step 506 is discussed in greater detail above in relation to FIG. 12.

The random numbers are selected from the same game number set 1502 (FIG. 5) from which the set of player numbers was selected at step 404 of FIG. 15. The number of random numbers in the selected set in each drawing round is equal to the number of player numbers in the set of player numbers received at step 502.

In at least one embodiment, each set of random numbers in a drawing round does not include duplicate numbers. That is, once a number is selected in a drawing round, it cannot be selected as one of the other random numbers in the same drawing round. In at least some embodiments, the same random number may be selected in different drawing rounds. That is, the set of the random numbers selected in each drawing round is selected from the same set of numbers (i.e. the game number set).

Next, at step 511, main game winners are identified. The winner identification subsystem 248 will identify, as winners of the main game, any sets of player numbers in which each player number of the set corresponds to one or more of the random numbers selected in either the current drawing round or any previous drawing rounds. That is, winners of the main game are identified by identifying any of the sets of player numbers received at step 502 in which each player number in that set has a corresponding random number selected in the current drawing round or in any previous drawing rounds.

Next, at step 513, side game winners are identified. The winner identification subsystem 248 will, in at least some embodiments, identify, as winners of the side game, any sets of player numbers in which a predefined number of number of player numbers in that set correspond to random numbers selected in the present drawing round. By way of example, the predetermined number may be five. In such embodiments, a player must match five of their player numbers to random numbers selected in a single drawing round to be declared a winner of the side pot. In at least some embodiments, the predetermined number is less than the total number of numbers in the set of player numbers.

Next, at step 515, a determination is made as to whether the number of main game winners exceeds a predetermined winner threshold. The winner threshold will require that at least two winners be selected. However, two is meant to be a floor and not a ceiling. That is, the minimum winner threshold in most embodiments is two. However, the winner threshold may be much larger. By way of example and not limitation, in some embodiments the winner threshold may be twenty (20) winners.

If the winner threshold is not met, at step 510 a new drawing round is begun.

This process continues until the number of main game winners exceeds the threshold.

Next, at step 514, a result indication is sent from the game server 114 to the game terminals 106. The result indication indicates the result of the game. The result indication includes the set of random numbers that was selected in each drawing round. That is, the result indication includes a plurality of sets of random numbers, each set of random numbers being associated with a separate drawing round. The result indication may include the result of both the main game and the side game.

Next, at step 516, the game server 114 pays winners of the game. Winners of the game may be paid by distributing funds in the main prize pot of entry fees established at step 505 (where such a prize pot has been established). The funds may be distributed according to a predetermined payment schedule which allocates a larger portion of the prize pot to winners drawn in an earlier round than is allocated to winners drawn in a later round. The step 516 may include a step of crediting an account associated with the player.

In at least some embodiments, winners of the main game are paid from a separate pool of funds than winners of the side game. That is, winners of the main game may be paid from the main pot and winners of the side game may be paid from the side pot. The side pot may be taken from a different pool of funds than the main pot.

While the processes 400, 500, 1300, 1302, 1306 and 1308 have been described as occurring in a particular order, it will be appreciated by persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

It will also be appreciated that, while the discussion above referred to embodiments in which numbers were selected with software or hardware based RNGs, in other embodiments, live drawings could be conducted in order to select random numbers.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions recorded thereon for performing the methods described herein. For example, the present disclosure is also directed at a computer readable medium having encoded thereon instructions for executing any one or a combination of the processes 400, 500, 1300, 1302, 1306 and 1308.

Certain adaptations and modifications of the described embodiments can be made. Therefore, the above discussed embodiments are considered to be illustrative and not restrictive.

What is claimed is:

1. A method of selecting a plurality of winners of a game, the method comprising:
  receiving at a game server, a plurality of sets of player numbers from a plurality of game terminals, each set having a predetermined number of player numbers, each player number being selected from a predetermined game number set;
  determining the plurality of winners of the game by conducting iterative drawing rounds until the number of winners exceeds a winner threshold, wherein each drawing round comprises:
  selecting a set of random numbers, the number of random numbers in the set of random numbers being equal to the number of player numbers in the set of player numbers; and
  identifying as winners any sets of player numbers in which each player number of the set corresponds to one or more of the random numbers selected in either the current drawing round or any previous drawing rounds; and
  sending a result indication to the plurality of game terminals.

2. The method of selecting a plurality of winners of claim 1, wherein in each drawing round selecting a set of random numbers comprises randomly selecting a set of numbers from the game number set.

3. The method of claim 1, further comprising, prior to determining the plurality of winners of the game:

waiting until a predetermined number of sets of player numbers have been received at the game server.

4. The method of claim 1, wherein sending a result indication to the plurality of game terminals occurs after a final drawing round, the final drawing round occurring after the number of winners exceeds the winner threshold, and wherein the result indication includes an identification of all sets of random numbers selected in all drawing rounds.

5. The method of claim 4 wherein the result indication includes synchronization information for synchronizing a display of results on the plurality of game terminals.

6. The method of claim 1, wherein identifying as winners comprises identifying any of the sets of player numbers in which each player number has a corresponding random number selected in the current round or in any previous drawing rounds.

7. The method of claim 1, wherein the sets of player numbers are the same in each drawing round.

8. The method of claim 1, wherein each set of player numbers comprises at least two player numbers.

9. A game server for selecting a plurality of winners of a game, the game server comprising:
a communications subsystem for communicating with a plurality of game terminals; and
a winner identification subsystem for identifying the winners of a game, the winner identification subsystem being configured to:
receive at a game server, a plurality of sets of player numbers from a plurality of game terminals, each set having a predetermined number of player numbers, each player number being selected from a predetermined game number set;
determine the plurality of winners of the game by conducting iterative drawing rounds until the number of winners exceeds a winner threshold, wherein each drawing round comprises:
selecting a set of random numbers, the number of random numbers in the set of random numbers being equal to the number of player numbers in the set of player numbers; and
identifying as winners any sets of player numbers in which each player number of the set corresponds to one or more of the random numbers selected in either the current drawing round or any previous drawing rounds; and
send a result indication to the plurality of game terminals.

10. The game server of claim 9, wherein in each drawing round selecting a set of random numbers comprises randomly selecting a set of numbers from the game number set.

11. The game server of claim 9, further comprising, prior to determining the plurality of winners of the game:
waiting until a predetermined number of sets of player numbers have been received at the game server.

12. The game server of claim 9, wherein sending a result indication to the plurality of game terminals occurs after a final drawing round, the final drawing round occurring after the number of winners exceeds the winner threshold and wherein the result indication includes an identification of all sets of random numbers selected in all drawing rounds.

13. The game server of claim 12 wherein the result indication includes synchronization information for synchronizing a display of results on the plurality of game terminals.

14. The game server of claim 9, wherein identifying as winners comprises identifying any of the sets of player numbers in which each player number has a corresponding random number selected in the current round or in any previous drawing rounds.

15. The game server of claim 9, wherein the sets of player numbers are the same in each drawing round.

16. The game server of claim 9, wherein each set of player numbers comprises at least two player numbers.

17. The game server of claim 9 wherein the winner identification subsystem is comprised of one or more processor.

18. A method of providing results on a game terminal comprising:
receiving, from an input mechanism associated with the game terminal, a selection of a set of player numbers;
transmitting the set of player numbers to a game server;
receiving a result indication from the game server, the result indication indicating the result of the game, the result indication including a plurality of sets of random numbers, each set of random numbers being equal to the number of player numbers in the set of player numbers, and each set of random numbers being associated with a separate drawing round; and
displaying, on a display screen associated with the game terminal, an indication of the received results; and
displaying, on a display screen associated with the game terminal, an indication of winners when the number of winners exceeds a threshold, each winner having player numbers each corresponding to random numbers selected in one or more separate drawing round of the game.

19. The method of providing results of claim 18 wherein displaying an indication of the received results comprises:
simulating a real-time selection of winners.

20. The method of providing results of claim 19, wherein simulating a real-time selection of winners comprises:
iteratively displaying a result of each drawing round.

21. The method of providing results of claim 20, wherein iteratively displaying a result of each drawing round comprises, for each drawing round:
displaying the set of random numbers associated with that drawing round; and
displaying an indication of winners associated with that drawing round.

* * * * *